United States Patent

Tracy et al.

[11] Patent Number: 5,780,118
[45] Date of Patent: Jul. 14, 1998

[54] METHOD FOR INCREASING HYDROPHILICITY OF TRANSPARENCIES USED AS RECORDING MEDIA IN A THERMAL INK JET PRINTER

[75] Inventors: Mark D. Tracy, Rochester; Dale R. Ims, Webster, both of N.Y.

[73] Assignee: Xerox Corporation, Stamford, Conn.

[21] Appl. No.: 673,533

[22] Filed: Jul. 1, 1996

[51] Int. Cl.⁶ .................................................. C08F 2/48
[52] U.S. Cl. ...................... 427/508; 427/197; 427/322; 427/536; 427/539; 427/558; 427/570; 427/595
[58] Field of Search ...................... 427/536, 539, 427/558, 570, 595, 322, 197, 508

[56] References Cited

U.S. PATENT DOCUMENTS

| | | | |
|---|---|---|---|
| 3,846,141 | 11/1974 | Ostergren et al. | 106/22 |
| 4,638,377 | 1/1987 | Dakin | 358/343 |
| 4,673,627 | 6/1987 | Kunichika et al. | 430/49 |
| 4,725,862 | 2/1988 | Matsuzaki | 346/140 R |
| 4,865,914 | 9/1989 | Malhotra | 428/331 |
| 4,877,688 | 10/1989 | Senoo et al. | 428/522 |
| 5,006,407 | 4/1991 | Malhotra | 428/336 |
| 5,100,469 | 3/1992 | Pontes et al. | 106/20 |
| 5,141,556 | 8/1992 | Matrick | 106/20 |
| 5,229,172 | 7/1993 | Cahalan et al. | 427/536 |
| 5,372,884 | 12/1994 | Abe et al. | 428/331 |

OTHER PUBLICATIONS

Dr. N. Stewart McIntyre and Mary Jane Walzak, "New UV/Ozone Treatment Improves Adhesiveness of Polymer Surfaces," *Modern Plastics*, Mar. 1996, pp. 79-81.

Primary Examiner—Bernard Pianalto

[57] ABSTRACT

A transparency for ink jet printing is enhanced for use as an ink jet recording medium by increasing the hydrophilicity of the coating formed on a transparent substrate. In one embodiment, the coating is subjected to a corona plasma discharge exposure to create changes in oxygen functionality at the coating surface resulting in increases in surface hydrophilicity. In another embodiment, the surface is exposed with UV radiation and ozone exposure for controlled periods of time. In both cases, the surface hydrophilicity is increased by generating highly reactive free radical oxygen ($O^-$) which results primarily in increases in the oxygen functional groups $C=O$ and $COO^-$.

6 Claims, 2 Drawing Sheets

METHOD FOR INCREASING HYDROPHILICITY OF TRANSPARENCIES USED AS RECORDING MEDIA IN A THERMAL INK JET PRINTER

BACKGROUND OF THE INVENTION AND MATERIAL DISCLOSURE STATEMENT

This invention relates to transparency recording media used in ink jet printing and, more particularly, to a method for enhancing hydrophilicity of a coated transparency to increase overall diameter of ink spots ejected onto the transparency coating.

In ink jet printing, electronic image signals, typically from a computer, are applied to the drive circuitry of an ink jet printhead. The printhead array takes various forms but, in its essential elements, includes a source of ink which is fluidly connected to a plurality of nozzles. Ink droplets are selectively expelled from the nozzles, either by thermal heating means or piezoelectric means to create an image pattern of ink droplets on a recording medium which is moved past the printhead. U.S. Pat. No. 4,638,377, discloses one example of a thermal ink jet printer. U.S. Pat. No. 3,846,141 describes an example of a piezoelectric type of ink jet printer.

In current ink jet printing applications, several inks (typically black, cyan, magenta and yellow) are used to print textual and graphic information on a printing medium, typically ordinary non-coated paper. The inks primarily are composed of water, and contain a colorant that may be a dye or pigment dispersion. The inks also generally contain a polyhydric alcohol to prevent nozzle clogging, and may contain various additives.

Another type of ink jet recording media is the increased use of transparencies used for overhead projectors. It was early realized that ink jet recording onto conventional transparent film was not feasible since the recording surface of the film had little or no ink absorbency; therefore, aqueous inks required a lengthy time for drying. Once solution to this problem is to form a transparency by forming on a transparent substrate, a transparent ink-absorbing layer high in ink receptivity. U.S. Pat. No. 4,877,688 discloses one example of a transparency recording sheet which comprises a transparent substrate with a light transmitting coating containing an emulsion polymerized composition.

U.S. Pat. No. 5,006,407 discloses a transparency which comprises a supporting substrate and a coating containing a plasticizer.

U.S. Pat. No. 5,372,884 discloses a transparency which comprises a support and an ink receiving layer which contains a cation-modified, non-spherical colloidal silica.

An article entitled "New UV/ozone treatment improves adhesiveness of polymer surfaces", Modern Plastics, March 1996, pgs. 79–81, describes a UV/ozone treatment of hydrophobic polymer to increase polymer surface energy.

All of the above-referenced patents are hereby incorporated by reference.

While these prior art transparency structures produce some improvement in ink absorption, factors such as haze, coatability and system printing constraints limit the usable coating material base and, often, the degree of wettability (hydrophilicity) the coatings can obtain. In addition, in order to minimize inter-color bleed on plain paper recording sheets, the inks (especially color inks) are usually formulated to rapidly penetrate into the paper. When the droplet volumes are adjusted to give the proper spot sizes on a range of plain papers, the resulting spots on transparencies are too small to give complete solid area fill. The problem of complete solid area fill is worsened by directionality errors in the printhead.

SUMMARY OF THE INVENTION

A first object of the invention is to provide a method for forming an ink jet transparent recording sheet with improved ink absorption properties.

A second object is to enhance the hydrophilicity of coatings formed on a transparent recording sheet so as to increase the image spot size for ink droplets ejected onto the coating surface of the recording sheet.

These, and other objects, are realized by treating the surface of the recording sheet so as to change the functionality of oxygen groups, especially carboxyl (C=O) and benzoic (COO$^-$), at the surface. These changes in functionality at the recording sheet surface increases the hydrophilicity of the surface. Subsequent ink drop ejection onto the surface results in an increase in ink spot diameter.

In one embodiment, a recording sheet consisting of a Mylar substrate coated with a plasticized coating is subjected to a coronal discharge plasma treatment generating high reactive free radical oxygen (O$^-$) which incorporates itself into the surface of the coating to a sub-micron depth. In another embodiment, using the same type of recording sheet, the surface is exposed to an ozone source in conjunction with light exposure from a UV light source. The UV light accelerates the decomposition of ozone into $O_2+O^-$. The free radical $O^-$ is again available to react with the coating surface.

More particularly, the present invention relates generally to a method for increasing the hydrophilicity of an ink recording media which comprises a transparent substrate upon which is formed a transparent coating of a plasticizer and an organic compound comprising the steps of:

subjecting the surface of the coating to a coronal discharge and maintaining the discharge for a time sufficient to create oxygen functionality changes at the surface of the coating.

Further, the invention also relates to a method for forming a transparency for use as an ink jet recording sheet comprising the steps of:

forming a supporting substrate selected from the group consisting of poly(ethylene terephthalate), cellulose acetate, cellophane, polysulfone, polyvinyl chloride, and polypropylene.

forming a coating on said substrate, the coating comprising a plasticizer and a member selected from the group consisting of cellulose ester, alkyl cellulose, cyanoalkyl cellulose, carboxyalkyl cellulose, carboxyalkyl hydroxyalkyl cellulose, hydroxyalkyl cellulose, hydroxyalkyl methyl cellulose, acrylamide, a poly (alkylene oxide), and mixtures thereof and exposing the surface of the coating to a plasma corona discharge sufficient to cause changes in the oxygen functionality at the surface to a depth of about one micron.

DESCRIPTION OF THE INVENTION

Figure 1:
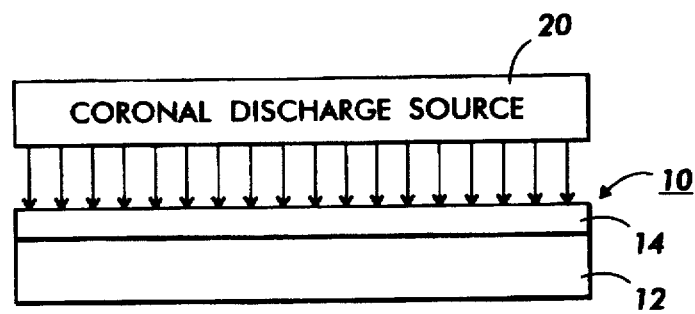
FIG. 1 shows the surface of a coated transparency being subjected to a corona discharge exposure to change the functionality of oxygen at the surface.

FIG. 1 shows an overcoated transparency subjected to a coronal discharge plasma to increase wettability of the coating surface. In a specific example, transparency 10 comprises a substrate 12 coated with a 12 μ thick plasticized layer 14.

Illustrative examples of substrates usually, for example, with a thickness of from about 50 microns to about 125 microns, and preferably of a thickness of from about 100 microns to about 125 microns that may be selected for the ink jet transparencies include Mylar, commercially available from E. I. DuPont; Melinex, commercially available from Imperials Chemical, Inc.; Celanar, commercially available from Celanese; polycarbonates, especially Lexan; polysulfones; cellulose triacetate; polyvinylchlorides; and the like, such as those illustrated in U.S. Pat. No. 4,865,914, the disclosure of which is totally incorporated herein by reference, with Mylar being particularly preferred in view of its availability and lower costs.

Specific coatings that may be selected for the ink jet transparency substrates or for the ink jet papers include carboxymethyl cellulose, carboxymethyl hydroxyethyl cellulose, hydroxypropyl methyl cellulose, poly (acrylamide), or mixtures thereof, which coatings contain therein plasticizers such as glycols, glycerols, pyrrolidinones, propylene carbonates, ethylene carbonates, other alkyl carbonates, sulfolanes, and fillers such as silica, titanium dioxide and the like; blends of (1) poly(ethylene oxide), hydroxypropyl cellulose, and carboxymethyl cellulose; (2) poly(ethylene oxide), hydroxyethyl cellulose, and carboxymethyl cellulose; (3) poly(ethylene oxide) with vinylmethyl ether/maleic acid copolymer and hydroxypropyl cellulose; (4) hydroxypropyl methyl cellulose, carboxymethyl cellulose, and polyethylene oxide with plasticizers and fillers, or a plasticizer or a filler therein. The aforementioned blends are selected in various effective percentages depending, for example, on the composition of the supporting substrate.

In one example, layer 14 is comprised of 45% hydroxypropylmethyl cellulose, 45% latex and 10% 3,5 dihydroxybenzoic acid. Transparency 10 was fed in a direction into the page at a feed rate of 50 FPM by means not shown. Transparency 10 passes beneath coronal discharge source 20. Source 20, for this example, is an Enercon Bare Roll Treater Station (Model No. T212V-150/2) which constitutes a corona plasma generator. The coating 14 is subjected to a first exposure level of 3.3 watts/sq. foot generating highly reactive free radical oxygen ($O^-$) which incorporates itself into the surface of the coating to a sub-micron depth. This has the effect of reforming chemical bonds to increase the oxygen functionality in ways demonstrated in comparison of the plots shown in FIGS. 2 and 3, discussed in detail below. The transparency 10 was then used as the recording medium in an ink jet printer using an ink of the type disclosed in U.S. Pat. Nos. 5,100,469 or 5,141,556, whose contents are hereby incorporated by reference. The transparency 10 was then used as a recording medium in a thermal ink jet printer system of the type disclosed in U.S. Pat. No. 4,638,377, whose contents are hereby incorporated by reference. A predetermined pattern of ink droplets was expelled onto the treated coated surface. The hydrophilicity of the surface of coating 14 was measured by comparing the spreading of the ink drops relative to a measurement of the spot size of an untreated (unexposed) transparency.

A second and third exposure of a transparency 10 at levels of 6.6 and 13.3 watts/sq. foot were performed followed by a second and third relative measurement of spot spreading. The results in Table 1 show that the increasing exposure levels (increased $O^-$ creation) results in a corresponding increase in the spreading of the ink drops on the surface of coating 14.

Figure 2:
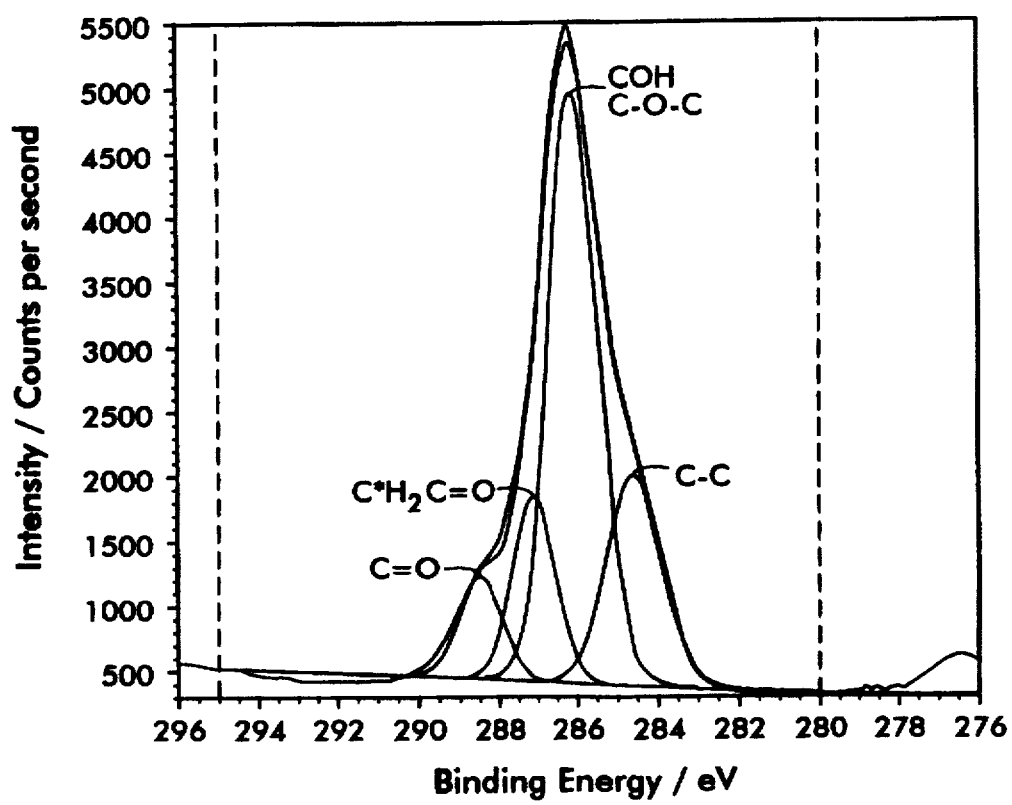
FIG. 2 shows an X-ray Photoelectron Spectroscopy (XPS) plot of the bonds present at the surface of an untreated coated transparency.
Figure 3:
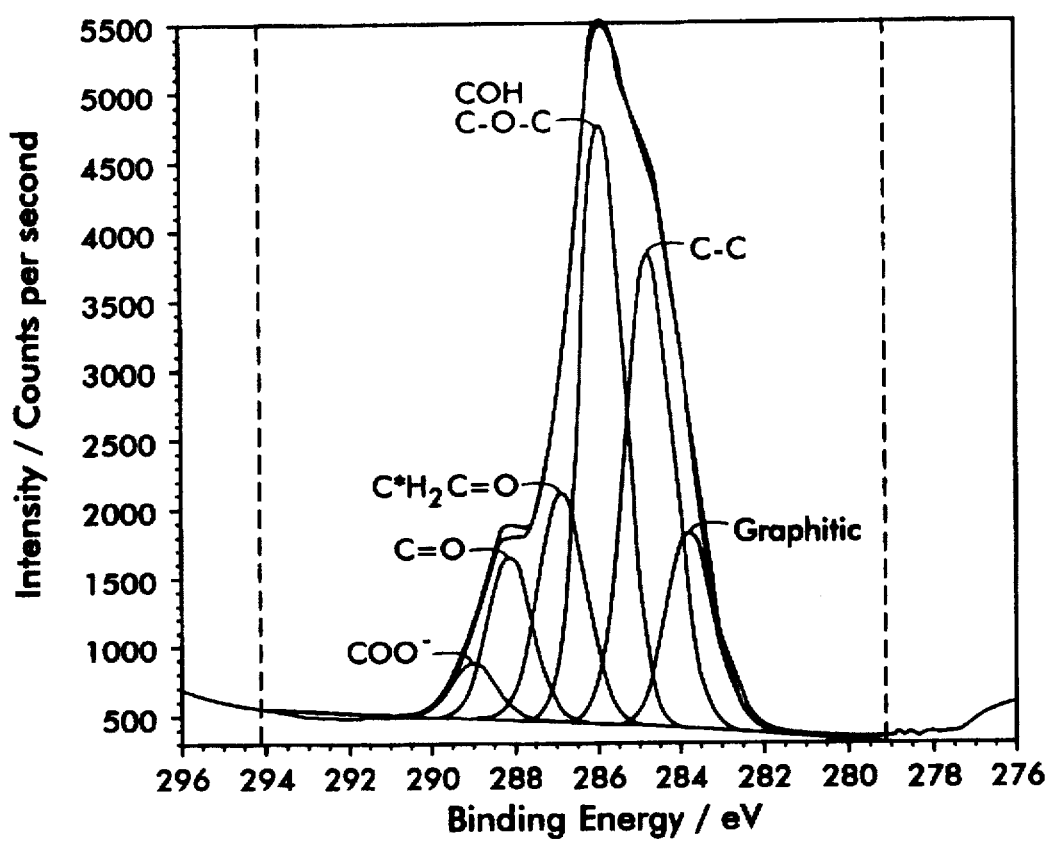
FIG. 3 shows an XPS plot of the bonds present in the coated transparency exhibiting an increase in $COO^-$ and $C=O$ concentration following coronal exposure of the surface.

The increase in hydrophilicity of the surface produced by increased exposure levels is attributed to chemical changes in coating 14 resulting in higher oxygen functionality. Untreated and treated samples of coating 14 were analyzed using XPS (X-ray photoelectric spectroscopy). The results are shown in FIGS. 2 and 3, respectively, where electron binding energy is plotted against signal level. FIG. 3, representing the energy for the exposed coating, shows an increased amount of the $COO^-$ and $C=O$ groups in the coronal treated sample. The increased amount of these groups is caused by oxygen ($O^-$) incorporation during the coronal plasma exposure.

TABLE 1

| Exposure Level (Watts/sq. foot) | Spot diameter increase % |
|---|---|
| 0 | 0 |
| 3.3 | 116 |
| 6.6 | 127 |
| 13.3 | 128 |

As another example of the efficiency of coronal discharge plasma treatment of transparency coatings, a Mylar substrate 12 was formed with a 12 mm thick material layer 14 comprised of [84% Polyvinyl alcohol—15% 3,5 Dihydroxybenzoic Acid—1% Methylcellulose] was subjected to coronal discharge plasma treatment from station 20. At a feed rate of 50 FPM, the transparency coating 14 was subjected to an exposure of 13.3 Watts/sq. foot. A thermal ink jet device was then used to apply equivalent volumes of ink having the same ink drops, the ink having the same characteristics referenced supra on untreated and treated coating samples. The relative hydrophilicity of the surfaces was measured indirectly through the extent of spreading of the thermal ink jet drops applied to the coating surfaces. The results in Table 2 show that coronal discharge plasma treatment produces an increase in the spreading of thermal ink jet drops on the coating surface.

TABLE 2

| Exposure Level (Watts/sq. foot) | Spot diameter increase % |
|---|---|
| 0 | 0 |
| 13.3 | 120 |

Figure 4:
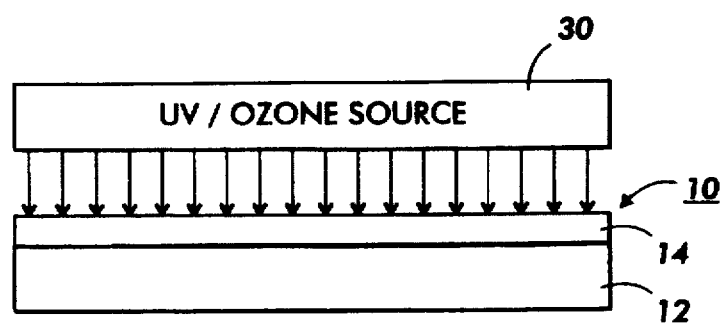
FIG. 4 shows the surface of a coated transparency being subjected to UV radiation and ozone exposure to change the functionality of oxygen at the surface.

According to a second aspect of the invention, an overcoated transparency 10 is subjected to an ultraviolet (UV) radiation simultaneously with injection of ozone ($O_3$) to increase hydrophilicity of the coating. In one embodiment and referring to FIG. 4, a Mylar substrate 12 is coated with a layer 14 of the same composition disclosed in the first coronal discharge example; e.g., a 12 mm thick layer comprised of 45% Hydroxypropylmethyl Cellulose—45% Latex—10% 3,5 Dihydroxybenzoic Acid. Transparency 10 is fed in the direction of the page past a UV/Ozone source 30. Source 30 comprises an ozone generating source and a source of UV radiation comprising, for example, one or more mercury lamps with critical output wavelengths of 185 and 254 nm. The surface of coating 14 is subjected to UV radiation and ozone exposure simultaneously over a predetermined time. A thermal ink jet device supplied with the previously defined ink type was then used to apply equivalent volumes of ink drops on untreated and treated coating samples. The relative hydrophilicity of the surfaces was measured indirectly through the extent of spreading of the thermal ink jet drops applied to the coating surfaces. The results in Table 3 show that UV/Ozone treatment produces an increase in the spreading of thermal ink jet drops on the coating surface as a function of Ozone concentration with fixed exposure time. The results in Table 4 show that UV/Ozone treatment produces an increase in the spreading of thermal ink jet drops on the coating surface as a function of Ozone exposure time with fixed concentration.

TABLE 3

Vary Ozone Concentration

| Ozone concentration (cc/min) | Exposure Time (min) | Spot diameter increase % |
|---|---|---|
| 0 | 0 | 0 |
| 1000 | 10 | 101 |
| 1500 | 10 | 120 |
| 2000 | 10 | 137 |

TABLE 4

Vary Ozone Exposure Time

| Ozone concentration (cc/min) | Exposure Time (min) | Spot diameter increase % |
|---|---|---|
| 0 | 0 | 0 |
| 2000 | 2 | 115 |
| 2000 | 5 | 127 |
| 2000 | 10 | 137 |

From the above description, certain conclusions can be drawn:

1. The hydrophilicity of a transparency with an organic coating increases when the oxygen functionality at the coating surface is modified.
2. The oxygen functionality is changed by reaction of ozone and UV light.
3. The changes in oxygen functionality takes place at a surface depth less than 1 micron in the coronal discharge technique.
4. When the ozone exposure technique is combined with UV radiation at the surface, the depth at which the functionality changes occurs extends up to slightly over a micron.
5. With the combined UV/Ozone surface treatment, an optimum way to rapidly approach a desired increase of hydrophilicity as measured by spot diameter increase is to produce a high ozone concentration (e.g., 2000 cc/mm) for a short (e.g., 5 minute) time period.

Although two preferred embodiments have been set forth as suitable transparencies. it is understood that other materials may be used both for the substrate 12 and coating 14. Instead of a Mylar substrate 12, other materials can be selected from a group consisting of cellulose acetate, cellophane, polysulfone, polyvinyl chloride and polypropylene. Instead of the coating which includes hydroxyalkyl cellulose, other alkyl cellulose or hydroxy-alkyl cellulose can be selected from the group consisting of a cellulose ester, alkyl cellulose, cyanoalkyl cellulose, carboxyalkyl cellulose, carboxyalkyl hydroxyalkyl cellulose, hydroxyalkyl cellulose, an acrylamide, poly(alkylene oxide), and mixtures thereof For the coating which consists of an emulsion polymerized composition including polyvinyl alcohol with 1% methylcellulose, other examples of composites may be used as set forth in U.S. Pat. No. 4,877,688 referenced supra.

While the embodiment disclosed herein is preferred, it will be appreciated from this teaching that various alternative, modifications, variations or improvements therein may be made by those skilled in the art, which are intended to be encompassed by the following claims:

We claim:

1. A method for increasing the hydrophilicity of an ink recording media which comprises a transparent substrate upon which is formed a transparent coating comprising a plasticizer and a member selected from the group consisting of cellulose ester, alkyl cellulose, cyanoalkyl cellulose, carboxyalkyl cellulose, carboxyalkyl hydroxyalkyl cellulose, hydroxyalkyl cellulose, hydroxyalkyl methyl cellulose, acrylamide, a poly(alkylene oxide), and mixtures thereof comprising the steps of:

exposing a surface of the coating to a coronal discharge and maintaining the discharge for a time sufficient to create oxygen functionality changes at the surface of the coating.

2. The method of claim 1 wherein said oxygen functionality changes generate highly reactive free radical oxygen ($O^-$) resulting in increases in $C=O$ and $COO^-$.

3. The method of claim 1 further including the further steps of first projecting ink droplets onto the unexposed coating and measuring spot diameter of the projected droplets and the additional step of projecting ink droplets onto the exposed coating surface and measuring the spot diameter of the projected droplet and adjusting the exposure for a period of time to increase spot diameter size 15% to 37% relative to the first measured diameter size.

4. The method of claim 1 wherein said transparent substrate is selected from the group consisting of poly(ethylene terephthalate), cellulose acetate, cellophane, polysulfone, polyvinyl chloride, and polypropylene.

5. A method for forming a transparency for use as an ink jet recording sheet comprising the steps of:

forming a supporting substrate selected from the group consisting of poly(ethylene terephthalate), cellulose acetate, cellophane, polysulfone, polyvinyl chloride, and polypropylene, forming a coating on said substrate, the coating comprising a plasticizer and a member selected from the group consisting of cellulose ester, alkyl cellulose, cyanoalkyl cellulose, carboxyalkyl cellulose, carboxyalkyl hydroxyalkyl cellulose, hydroxyalkyl cellulose, hydroxyalkyl methyl cellulose, acrylamide, a poly(alkylene oxide), and mixtures thereof and exposing a surface of the coating to UV radiation and ozone simultaneously over a predetermined time sufficient to cause changes in the oxygen functionality at the surface to a depth of about one micron.

6. The method of claim 5 wherein said oxygen functionality changes result in generation of highly reactive free radical oxygen (O—) which results in increases in $C=O$ and COO—.

* * * * *